United States Patent
Weinstein et al.

(10) Patent No.: US 7,483,411 B2
(45) Date of Patent: Jan. 27, 2009

(54) APPARATUS FOR PUBLIC ACCESS MOBILITY LAN AND METHOD OF OPERATION THEREOF

(75) Inventors: Stephen B. Weinstein, Summit, NJ (US); Jun Li, Highland Park, NJ (US); Junbiao Zhang, Highland Park, NJ (US); Nan Tu, Princeton, NJ (US)

(73) Assignee: NEC Corporation, Tokyo (JP)

( * ) Notice: Subject to any disclaimer, the term of this patent is extended or adjusted under 35 U.S.C. 154(b) by 861 days.

(21) Appl. No.: 10/058,379

(22) Filed: Jan. 30, 2002

(65) Prior Publication Data
US 2002/0191572 A1  Dec. 19, 2002

Related U.S. Application Data

(60) Provisional application No. 60/294,997, filed on Jun. 4, 2001.

(51) Int. Cl.
*H04Q 7/24* (2006.01)
(52) U.S. Cl. ........................ 370/338; 370/466
(58) Field of Classification Search ......... 370/352–356, 370/338, 349, 401, 395.5, 465, 466, 328
See application file for complete search history.

(56) References Cited

U.S. PATENT DOCUMENTS

| | | | |
|---|---|---|---|
| 6,674,760 B1 * | 1/2004 | Walrand et al. | 370/411 |
| 6,973,057 B1 * | 12/2005 | Forslow | 370/328 |
| 2002/0021689 A1 * | 2/2002 | Robbins et al. | 370/352 |
| 2002/0034168 A1 * | 3/2002 | Swartz et al. | 370/329 |
| 2002/0041568 A1 * | 4/2002 | Bender | 370/238 |
| 2002/0071418 A1 * | 6/2002 | Gouret et al. | 370/338 |
| 2002/0112076 A1 * | 8/2002 | Rueda et al. | 709/245 |
| 2002/0136226 A1 * | 9/2002 | Christoffel et al. | 370/401 |
| 2004/0054799 A1 * | 3/2004 | Meier et al. | 709/230 |
| 2004/0151151 A1 * | 8/2004 | Kubler et al. | 370/338 |
| 2005/0059390 A1 * | 3/2005 | Sayers et al. | 455/425 |

(Continued)

FOREIGN PATENT DOCUMENTS

JP  5-344117 A  12/1993

(Continued)

OTHER PUBLICATIONS

"IEEE 802.1 P, Q—QoS on the MAC level" by Niclas Ek, Dept. of Electrical Engineering, Helsinki University of Technology (Apr. 24, 1999).

(Continued)

*Primary Examiner*—Ajit Patel
(74) *Attorney, Agent, or Firm*—Sughrue Mion, PLLC

(57) ABSTRACT

Public wireless communications will increasingly extend into wireless LAN (WLAN) environments in order to meet the ubiquitous access, high data rate, and local services demands of future Internet appliances. By relying on IP-level services mechanisms, the Public Access Mobility LAN (PAMLAN) can simultaneously support different air interfaces, franchises for multiple services providers, and a multi-segment LAN environment including handoffs. The PAMLAN supports virtual operator LANs representing different network services providers, authorization and accounting mechanism, support of multiple air interfaces, and local IP mobility. A router associated with each base station realizes this highly distributed IP networking environment, and a QoS-enabled switched Ethernet core supports virtual networks and QoS services.

32 Claims, 11 Drawing Sheets

U.S. PATENT DOCUMENTS

| | | | |
|---|---|---|---|
| 2006/0126536 A1* | 6/2006 | Patel et al. | 370/254 |
| 2006/0190586 A1* | 8/2006 | Stewart et al. | 709/223 |

FOREIGN PATENT DOCUMENTS

| | | |
|---|---|---|
| JP | 9-130406 A | 5/1997 |
| JP | 11-252183 A | 9/1999 |
| JP | 2000-503198 A | 3/2000 |
| JP | 2000-341327 A | 12/2000 |
| JP | 2003-516000 A | 5/2003 |
| WO | WO 99/01969 A1 | 1/1999 |
| WO | WO 00/13436 A2 | 3/2000 |
| WO | WO 01/39538 A1 | 5/2001 |

OTHER PUBLICATIONS

"Virtual LAN Communications" by Cisco Systems, Inc. (1995).

"HiperLAN/2—The Broadband Radio Transmission technology Operating in the 5GHz Frequency Band".

"HiperLAN/2—The Broadband Radio Transmission technology Operating in the 5GHz Frequency Band" (1999).

* cited by examiner

APPARATUS FOR PUBLIC ACCESS MOBILITY LAN AND METHOD OF OPERATION THEREOF

CROSS-REFERENCES TO RELATED APPLICATIONS

This application is an application filed under 35 U.S.C. § 111(a), claiming benefit pursuant to 35 U.S.C. § 120 of the filing date of the Provisional Application Ser. No. 60/294,997 filed on Jun. 4, 2001, pursuant to 35 U.S.C. § 111(b). The Provisional Application Ser. No. 60/294,997 is incorporated herein by reference for all it discloses.

BACKGROUND OF THE INVENTION

1. Technical Field of the Invention

This invention is related to architecture for a publicly accessed wireless local area network that provides for seamless mobility between access points on the wireless local area network. The invention provides for differing levels of mobile subscriber services and packet level authentication and encryption. The architecture can be supported on existing local area networks and allows virtual operators to oversee the operation of the wireless local area network. The invention also provides for a method of operating the publicly accessed wireless local area network and its control and data protocols.

2. Description of the Related Art

There will now be provided a discussion of various topics to provide a proper foundation for understanding the invention.

The rapid evolution of Internet services and wireless technologies have stimulated the development of both cellular mobile and wireless LAN (WLAN) access systems for the wireless Internet, thereby providing users convenient Internet access and location-sensitive applications. Most existing WLAN access systems are either private, as in company or campus networks, or by subscription to the services of a WLAN operator.

Public services operators are being attracted to this type of private networking (enterprise LAN), both wired and wireless, in order to provide the capacity and performance expected by their customers. For a broad range of evolving Internet applications, including Internet audio and video multicasting and interactive multimedia applications, high speed and low delay are essential. The public cellular mobile network cannot fully meet this demand, even with the proposed enhancements of third generation (3G) mobile communication systems providing downstream burst rates up to 384 kbps outdoors and 2 Mbps rate indoors. These rates are a significant improvement over second-generation systems, and MIMO (multiple antennas) technology may significantly increase spectral efficiency. However, bandwidth will still be limited and costs will be high due to the huge monetary amounts paid by operators in spectrum auctions. This is an intrinsic problem because the 3G mobile system, like the 2G system, aims to provide continuous coverage in reserved spectrum. The capacity of the system is unlikely to be scalable to the investment cost.

WLAN technology can and does provide Internet access at low cost and with high capacity. It uses "free" spectrum (although, as described later, it may also implement cellular mobile microcells in reserved spectrum), is scalable, and is easily integrated into the wired network. There is a potential problem with interference between WLANs in the unregulated spectrum. It will be incumbent upon property owners, e.g., airports and hotels where public access through WLANs will become serious business operations, to enforce spectrum compatibility. The interference problem between IEEE 802.11 and Bluetooth systems, both of which may be supported by a property owner, is being addressed in IEEE 802.15.

Despite their limitations, the existing WLAN hot spot solutions are acceptable for many applications, using commercial wireless LAN technology such as Nokia's Public Access Zone, Cisco's Aironet and Lucent's ORINOCO Public Access Solutions. The wireless operators include such companies as MobileStar Corporation, Wayport and Nomadix.

Referring to FIG. 1, a conventional GSM cellular mobile system is illustrated. The GSM system comprises a hierarchical architecture comprised of a mobile switching center (MSC) 102 that is coupled to a base station 103 via circuit-switched networks. The mobile switching center 102 could also be coupled to other mobile switching centers as well as well as other base stations (not shown). The base station 103 comprises a base station controller (BSC) 104 and a plurality of base station transceivers (BTS) 105-1, 105-2, 105-n, where n is the number of base station transceivers connected to the base station controller 104. The mobile switching center 102 is coupled to a public switched telephone network (PTSN) interface 101. The mobile switching center 102 is coupled to a home location register (HLR) 106, a virtual location register (VLR) 107 and an equipment identity register (EIR) 108. The home location register 106 is also connected to an authentication center 109.

As illustrated in FIG. 1, the Generalized Packet Radio Service (GPRS), which is the data service version of GSM, uses a hierarchical architecture as well. A gateway GPRS/3G support node (GGSN) 110 is coupled to the home location register 106 and the Internet interface 116. The serving GPRS/3G support node (SGSN) 111 is coupled to the gateway GPRS/3G support node 110, the home location register 106 and the equipment identification register 108. The gateway GPRS/3G support node 110 and the serving GPRS/3G support node 111 are in a packet-switched domain and comprise the IP multimedia subsystem. The serving GPRS/3G support node 111 is coupled to the base station 103 via a packet-switched network. The serving GPRS/3G support node 111 is also coupled to a radio network base station 112 via the packet-switched network. The radio network base station 112 comprises a radio network controller 114 that is coupled to a plurality of base station transceivers 115-1, 115-n, where n is the number of base station transceivers. The architecture illustrated in FIG. 1 provides a core network that carries centralized traffic flows of circuit-switched voice, packet-switched data and IP multimedia traffic.

However, some standards bodies and forums are embracing the concept of a distributed IP-based mobile communications system without centralized traffic bottlenecks. Note that it is only the routings of mobile subscriber data that are presumed to be distributed. Control functions such as mobility management, authorization, authentication, accounting and directory services may or may not be distributed. The organizations include the Third Generation Partnership Project 2 (3GPP-2), the Internet Engineering Task Force (IETF), the Mobile Wireless Internet Forum (MWIF), and the IMT-2000 organization of the International Telecommunications Union (ITU).

Referring to FIG. 2, the 3GPP-2 network architectures based on IETF's mobile IP model are illustrated. In this architecture, there is no core network for mobile systems as illustrated in FIG. 1. Instead, a 2G system 201 comprising a home location register (HLR) 202 and a virtual location register (VLR) 203 is coupled to a radio network (RN) 204. The radio network 204 comprises a radio resource controller 206 (RRC) and a packet control function (PCF) device 205. The 2G system 201 is coupled to the radio resource controller 206. Internet appliance 207 can be coupled to the radio resource controller 206 as well. The radio network 204 in the 3GPP-2 architecture directly connects to a gateway (PDSN) 208 that is connected to an IP network 209, e.g., a LAN, MAN or WAN. A user home network 210 can be reached via the IP network 209. In addition, a wireless LAN (WLAN) 212 could also be coupled to the IP network 209 via a second gateway (PSDN) 211. Non-IP voice traffic has a direct path from the radio resource controller 206 to the public switched telephone network 213 (PSTN), so that the 2G voice network is maintained as an entity within 3G networks.

In addition, an IP-based mobility system is extensible, through the Internet, to outlying or temporary cellular mobile base stations and to WLANs. WLANs supporting 3G air interfaces, as well as IEEE 802.11, HiperLAN-2, and Bluetooth air interfaces, may some day be used for broadband access in public hot spots and in corporate and residential settings.

One disadvantage of present-day WLAN access services is the lack of public access, in that access to the WLAN is restricted to the subscribers of the specific WLAN operator. Another disadvantage is that a subscriber could be tied to a single access point. This has the potential of discouraging applications such as listening to Internet radio while wandering through a shopping mall. Another disadvantage is the potential restriction to a single WLAN air interface, thereby reducing the range of appliances, including those with cellular mobile air interfaces, that it would be desirable to support.

SUMMARY OF THE INVENTION

The invention has been made in view of the above circumstances and to overcome the above problems and limitations of the prior art.

A first aspect of the present invention provides a wireless network, comprising a plurality of subnetworks. Each subnetwork in the wireless network comprises one or more network switches. Each subnetwork further comprises one or more one air access points comprised of an air interface, an access control module and a router, and the router is coupled to the network switch. The wireless network further includes one or more routers that are connected to the network switches of each of the subnetworks to provide interconnectivity between the subnetworks. The wireless network also comprises one or more gateway routers that are connected to the plurality of subnetworks, in order to provide connectivity to other outside networks.

A second aspect of the invention provides a wireless network operated by a plurality of virtual operators. Each subnetwork in the wireless network comprises one or more network switches. Each subnetwork further comprises one or more one air access points comprised of an air interface, an access control module and a router, and the router is coupled to the network switch. The wireless network further includes one or more routers that are connected to the network switches of each of the subnetworks to provide interconnectivity between the subnetworks. The wireless network also comprises one or more gateway routers that are connected to the plurality of subnetworks, in order to provide connectivity to other outside networks. The second aspect of the invention provides access to services from each of the virtual operators by using multiprotocol label switching to route mobile subscriber data between the gateway routers and the plurality of subnetworks.

A third aspect of the present invention provides a method of authenticating a mobile subscriber accessing a wireless network, wherein the mobile subscriber accesses wireless network through an air access point comprising of an air interface and a computer, and the air access point computer is coupled to an database server storing a public key associated with the mobile subscriber. The method comprises sending a first message from the mobile terminal to the air access computer having a user identification number, computing a first codeword, and forwarding the first codeword to the database computer. Next, the method sends a second codeword from the database computer to the air access point computer, and then extracts a first random character string from the second codeword, and sends a second message comprising the user identification number and a first random character string to the mobile terminal. The method then sends a third message from the mobile terminal to the air access computer having a user identification number, the first random character string, a second random character string, and a third codeword. Next, the method computes a fourth codeword based on the third message received from the mobile terminal, and sends the fourth codeword to the database computer. After computing the fourth codeword, the method then computes a fifth codeword at the database computer and sends the fifth codeword to the air access computer. Finally, the method computes a sixth codeword and sends a fourth message from the air access computer to the mobile terminal, the fourth message comprised of the user identification number and the sixth codeword.

A fourth aspect of the present invention is a computer software product for authenticating a mobile subscriber accessing a wireless network, wherein the mobile subscriber accesses wireless network through an air access point comprising of an air interface and a computer, and the air access point computer is coupled to an database server storing a public key associated with the mobile subscriber. The computer software product comprises software instructions that enable the air access computer and the database computer to perform predetermined operations, and a computer readable medium bearing the software instructions. The predetermined operations comprise sending a first message from the mobile terminal to the air access computer having a user identification number, computing a first codeword, and forwarding the first codeword to the database computer. The predetermined operations further comprise sending a second codeword from the database computer to the air access point computer, and extracting a first random character string from the second codeword, and sending a second message comprising the user identification number and a first random character string to the mobile terminal. The predetermined operations further comprise sending a third message from the mobile terminal to the air access computer having a user identification number, the first random character string, a second random character string, and a third codeword, and thereafter computing a fourth codeword based on the third message received from the mobile terminal, and sending the fourth codeword to the database computer. The predetermined operations further comprise computing a fifth codeword at the database computer and sending the fifth codeword to the air access computer, and thereafter computing a sixth codeword and sending a fourth message from the air access computer to the mobile terminal, wherein the fourth message is comprised of the user identification number and the sixth codeword.

A fifth aspect of the present invention provides a method of operating a wireless network in which mobile services are provided by a plurality of virtual operators, wherein the wireless network comprises a plurality of subnetworks, each subnetwork comprising at least one network switch, and at least one air access point comprised of an air interface, an access control module and a router, wherein the router is coupled to the network switch, at least one router that is connected to the network switch of each of the plurality of subnetworks, and at least one gateway router that is connected to the plurality of subnetworks. The method comprises creating a plurality of multiprotocol label switching paths between the air access point in each subnetwork and the at least one gateway router. The method further comprises assigning each of the multiprotocol label switching paths to one of the plurality of virtual operators so that the virtual operators can be accessed through the air access point of each of the subnetworks, and assigning each of the plurality of virtual operators an identification tag that is embedded in a packet header of data that is traversing the wireless network. The method further comprises assigning multiprotocol label switching information to the headers of data packets traversing the wireless network, thereby allowing the network switches of the subnetworks to route the data packets through the multiprotocol label switching paths based on the headers of the data packets.

BRIEF DESCRIPTION OF THE DRAWINGS

The accompanying drawings, which are incorporated in and constitute a part of this specification illustrate aspects of the invention and, together with the written description, serve to explain the aspects, advantages and principles of the invention. In the drawings.

DETAILED DESCRIPTION OF THE INVENTION

Figure 1:
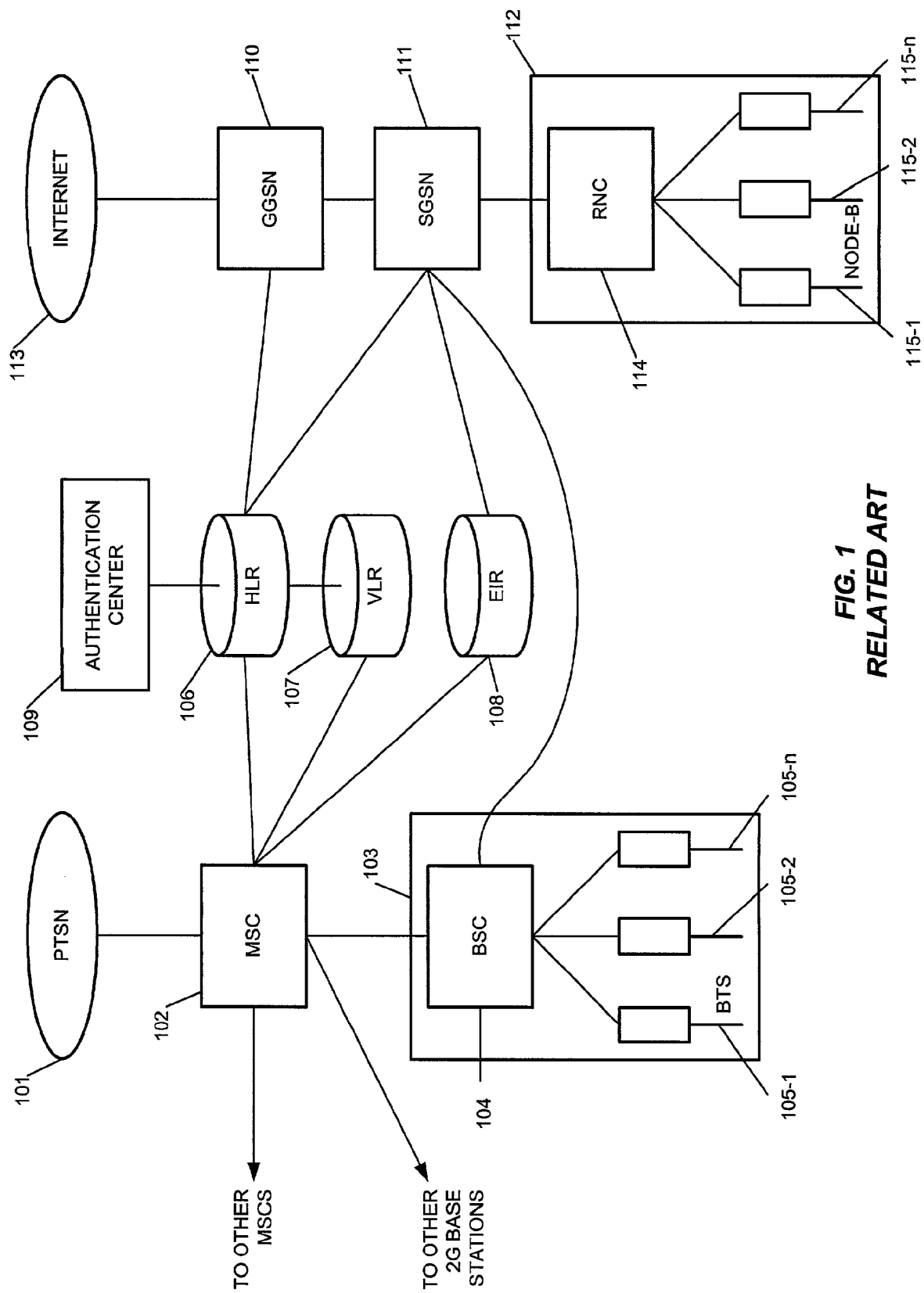
FIG. 1 illustrates an embodiment of the GPRS and 3G network architecture in 3GPP.
Figure 2:
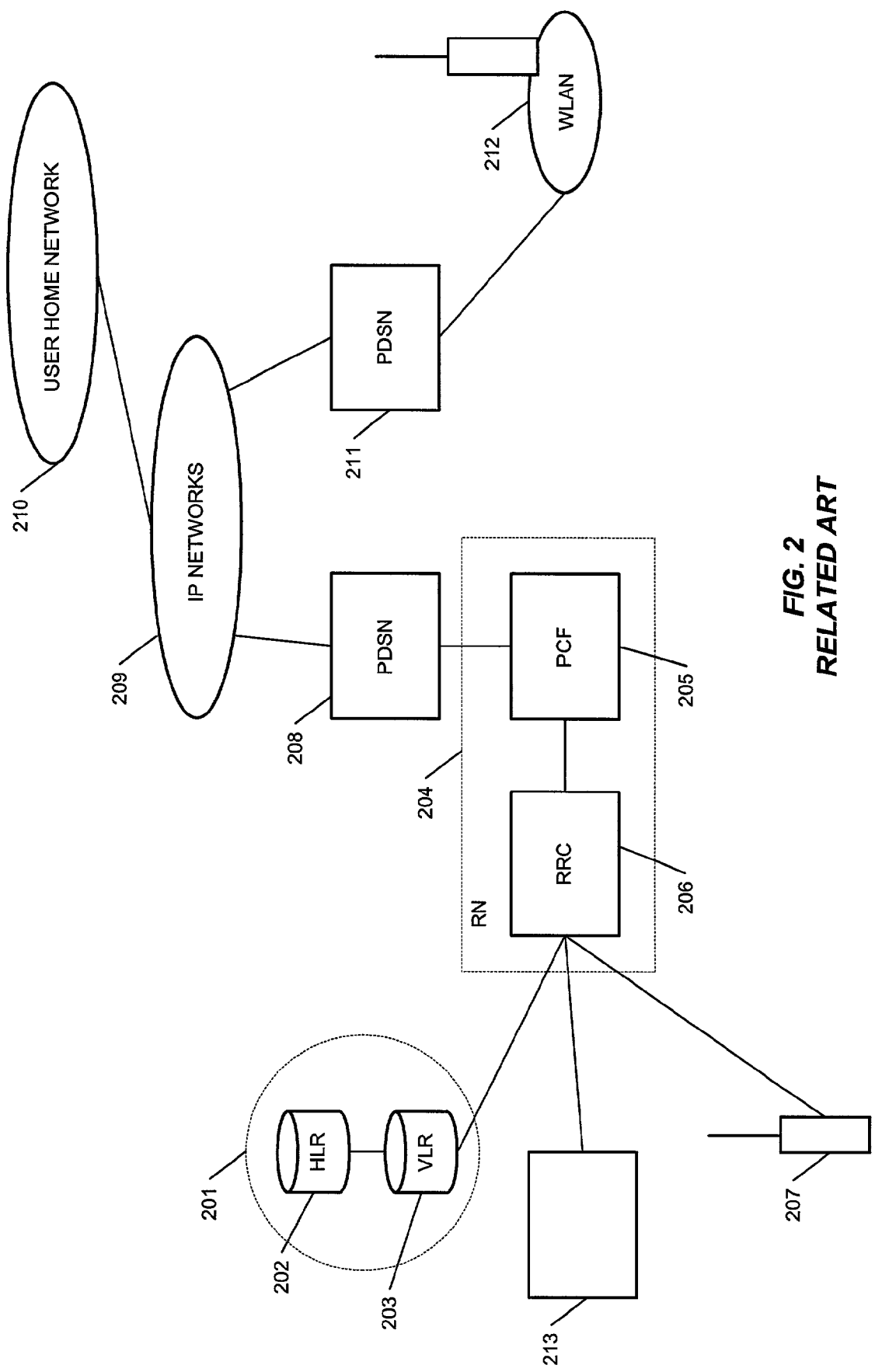
FIG. 2 illustrates an exemplary embodiment of the 3GPP2 distributed architecture.

Prior to describing the aspects of the invention, some details concerning the prior art will be provided to facilitate the reader's understanding of the invention and to set forth the meaning of various terms.

As used herein, the term "computer system" encompasses the widest possible meaning and includes, but is not limited to, standalone processors, networked processors, mainframe processors, and processors in a client/server relationship. The term "computer system" is to be understood to include at least a memory and a processor. In general, the memory will store, at one time or another, at least portions of executable program code, and the processor will execute one or more of the instructions included in that executable program code.

It will be appreciated that the term "predetermined operations," the term "computer system software," and the term "executable code" mean substantially the same thing for the purposes of this description. It is not necessary to the practice of this invention that the memory and the processor be physically located in the same place. That is to say, it is foreseen that the processor and the memory might be in different physical pieces of equipment or even in geographically distinct locations.

As used herein, one of skill in the art will appreciate that "media" or "computer-readable media" may include a diskette, a tape, a compact disc, an integrated circuit, a cartridge, a remote transmission via a communications circuit, or any other similar medium useable by computers. For example, to distribute computer system software, the supplier might provide a diskette or might transmit the instructions for performing predetermined operations in some form via satellite transmission, via a direct telephone link, or via the Internet.

Although computer system software might be "written on" a diskette, "stored in" an integrated circuit, or "carried over" a communications circuit, it will be appreciated that, for the purposes of this discussion, the computer usable medium will be referred to as "bearing" the instructions for performing predetermined operations. Thus, the term "bearing" is intended to encompass the above and all equivalent ways in which instructions for performing predetermined operations are associated with a computer usable medium.

Therefore, for the sake of simplicity, the term "program product" is hereafter used to refer to a computer useable medium, as defined above, which bears instructions for performing predetermined operations in any form.

A detailed description of the aspects of the invention will now be given referring to the accompanying drawings.

A conventional virtual LAN (VLAN) is a logical grouping and broadcast containment mechanism in a switched LAN environment. Switches in the LAN enforce logical group membership by forwarding broadcast/multicast Ethernet frames to the ports supporting devices belonging to the group. The IEEE VLAN standard, 802.1Q, specifies a 12-bit VLAN ID within a 4-byte section in the IEEE Ethernet header. Switches implementing 802.1Q need only examine the VLAN ID in each Ethernet frame to determine group membership.

The VOLAN of the present invention is a resource sharing and traffic engineering infrastructure that could extend across several LAN segments. The VOLAN permits virtual operators to offer independent QoS services to their respective user groups in accordance with their service level agreements. These independent services must not interfere with those services offered to existing local mobile subscribers in a pre-existing LAN environment on which the present invention is built. As described above, the VOLAN is a combination of the VLAN capabilities of commercial LAN switches and the use of Multi Protocol Label Switching (MPLS) paths across a multi-segment LAN environment.

The present invention is a wireless local area network architecture comprising one or more virtual operators that offer data access services to their mobile subscribers without having to invest in network facilities. The virtual operators operate in conjunction with third-party service providers such as Internet Service Providers (ISPs) and public communications carriers. The access speed of the present invention is superior to the relatively low-rate Internet access services of the digital cellular (2G) mobile telephony network. Furthermore, the present invention supports standard Internet and Web applications, as well as the reduced-rate versions appropriate for small-screen appliances (e.g., NTT DoCoMo's I-mode service). Low power Internet appliances are more feasible in the environment of the present invention than in the cellular mobile network. The present invention can comprise multiple LAN segments and be installed in office buildings, airports, hotels, universities, shopping malls and other large scale locations. The present invention can be constructed using presently existing LAN infrastructure by simply adding wireless access points, thereby avoiding costly new network deployments.

Figure 3A:
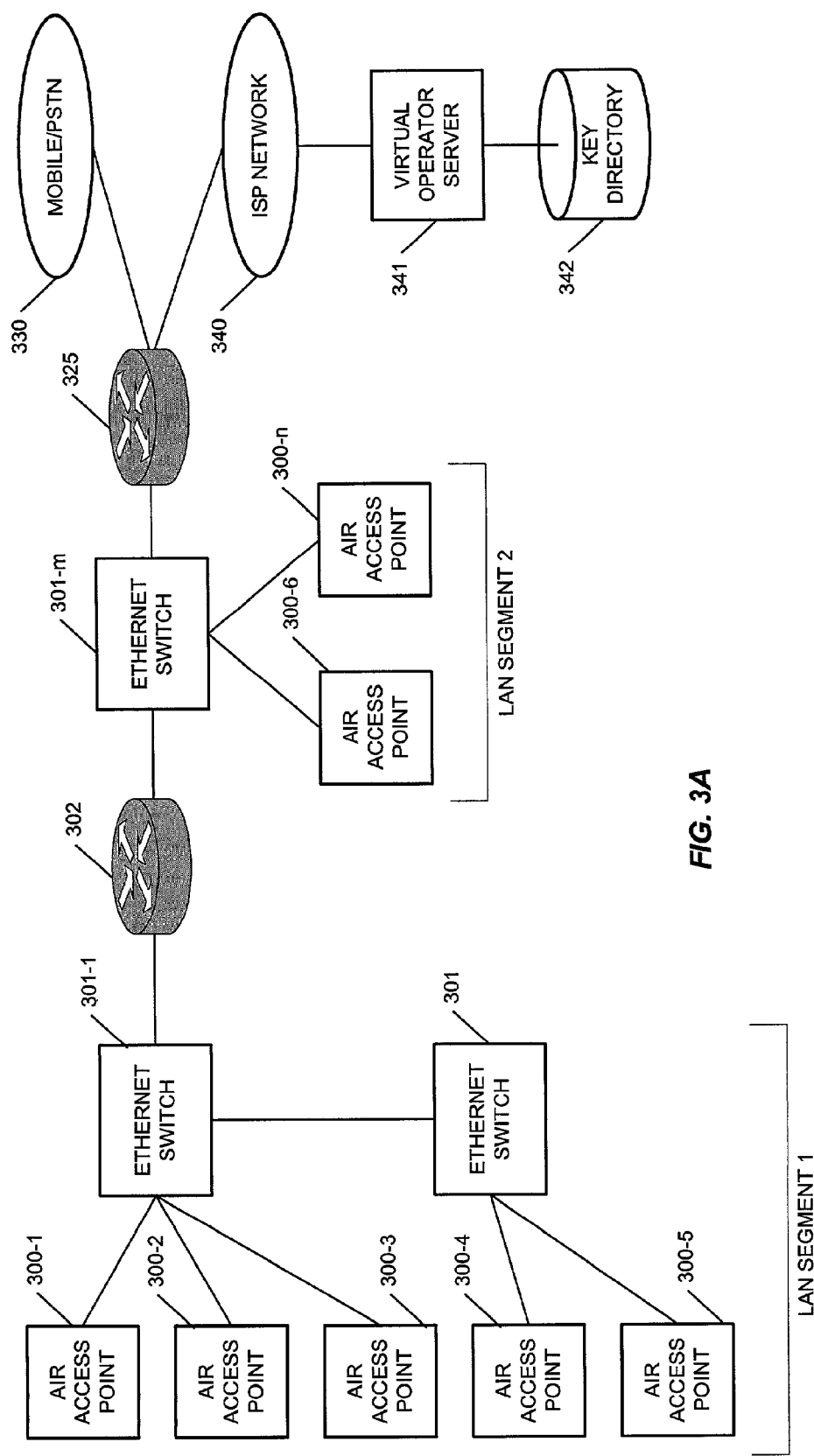
FIG. 3A illustrates an exemplary embodiment of the present invention.

The physical architecture of the present invention relates not only to individual wireless LANs specifically associated with the cellular mobile infrastructure, but to any local communications infrastructure that connects to the Internet and is constructed to support wireless access. Referring to FIG. 3A, an exemplary embodiment of the present invention comprises a plurality of LAN segments. Alternatively, in another embodiment, the present invention can be coupled to a metropolitan access network such as a cable data system. Within an implementation of the present invention, the virtual operators could be any third-party service providers, including, but not limited to, cellular mobile operators.

Within the present invention, each virtual operator controls a dedicated LAN. The dedicated LAN can extend across multiple network segments and is referred to as a Virtual Operator LAN (VOLAN). A VOLAN is an independent logical LAN that belongs to a virtual operator and is managed based on a Service Level Agreement (SLA) executed between the virtual operator and the Public Access Mobility LAN (PAMLAN) operator. A VOLAN provides secure traffic separation and can be traffic engineered with quality of service (QoS) support. For example, a virtual operator could provide various levels of services to subscribers that have different levels of subscription status. A VOLAN is constructed from underlying virtual LAN capabilities and inter-LAN-segment features. Table 1 describes the PAMLAN/VOLAN/VLAN hierarchy.

TABLE 1

PAMLAN/VOLAN/VLAN Hierarchy

| | |
|---|---|
| VLAN | Virtual LAN, implementing user group features such as broadcast containment within a physical LAN. |
| VOLAN | Virtual Operator LAN, extending VLAN capabilities across subnetworks for each virtual operator. |
| PAMLAN | Multiple virtual operators, wherein each virtual operator operates a VOLAN which includes authentication, association and accounting (AAA). |

Associate, Authenticate and Accounting (AAA) is a feature of the present invention. The present invention comprises a plurality of semi-trusted access points that become virtual extensions of a service provider's network. As used herein, "semi-trusted" is defined as:

1. Trusted to properly route the mobile subscriber's traffic to the Internet.
2. Partially trusted not to read, alter, or spoof mobile subscriber traffic content, e.g., a franchised operation with a business relationship with a virtual operator. This level of trust is similar to a local Internet Service Provider (ISP) and is adequate for most Internet browsing. However, for transfer of sensitive data, e.g., credit card information, Social Security Number, driver's license number, the present invention uses secure end-to-end transfer protocols, e.g., secure socket level (SSL).
3. Partially trusted to report correct accounting information to the virtual operators. In the exemplary embodiment of the present invention, service measurements by both the access point and the mobile appliance are executed. The service measurement results are reported to the virtual operator and the service measurements are cross-checked for consistency. In addition, the exemplary embodiment of the present invention prevents spoofing of the mobile customer because of a mobile subscriber/virtual operator authentication process. This authentication process renders the access point transparent. The service measurements and the authentication process greatly reduce the possibility of fraud and dispute.

The present invention uses authentication of the access points as a genuine franchised base station, as well as authentication and authorization of the visiting mobile subscriber. The present invention facilitates implementation of IP-level AAA server/client functions at the access points in order to support the virtual operator.

Referring to FIG. 3A, an exemplary embodiment of a wireless LAN network according to the present invention is illustrated. The exemplary network comprises a plurality of access points 300-1 to 300-n, where n is the total number of access points in the wireless LAN network. The composition of an access point is described with reference to FIG. 3B. Each access point 300 is connected to an Ethernet switch 301-1 to 301-m, where m is the total number of Ethernet switches in the wireless network. As illustrated in FIG. 3A, Ethernet switch 301 is connected to two access points 300. Each Ethernet switch 301 incorporates the virtual network and QoS services previously described.

As illustrated in FIG. 3A, the Ethernet switches 301 and the access points 300 are grouped into two LAN segments. LAN segment 1 comprises two Ethernet switches 301. LAN segment 2 comprises one Ethernet switch 301, which is connected to two access points 300. LAN segment 1 and LAN segment 2 are coupled to each other through a inter-segment gateway router 302. The coupling of the two LAN segments together provides micromobility between the plurality of access points.

Figure 3B:
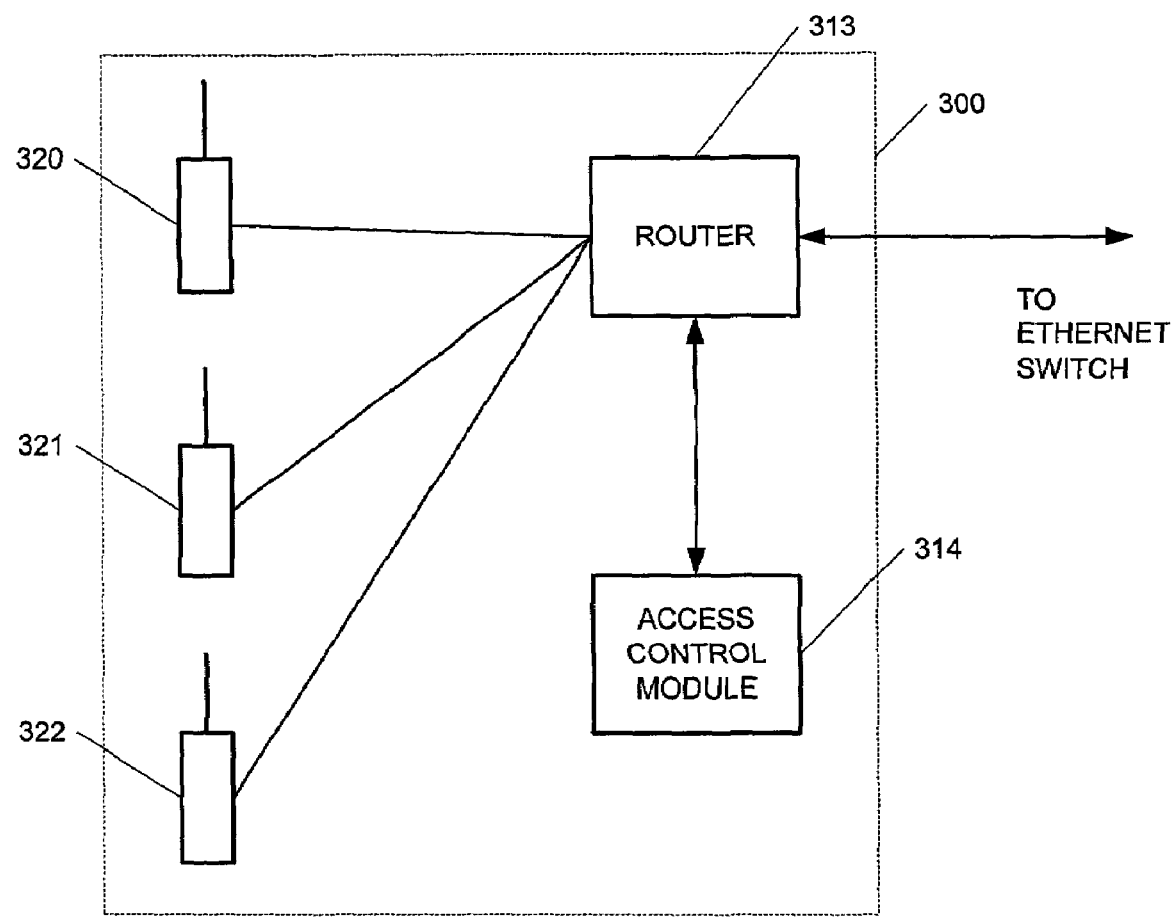
FIG. 3B illustrates an exemplary embodiment of an access point according to the present invention.

Referring to FIG. 3B, an access point is described in greater detail. According to the present invention, an access point comprises various air interfaces 320, 321, 322. The exemplary embodiment can comprise WLAN base stations (i.e., IEEE 802.11, HiperLAN 2, Bluetooth) and cellular mobile base stations (i.e., GSM, IS-95, IS-136, 3G). For cellular mobile voice services, the present invention supports GPRS data services (not shown) at the access point.

In a conventional WLAN system, the base station functions as a bridge. Referring to FIG. 3B, in the present invention, the access point further comprises an IP access router 313 that executes proxy functions for the mobile terminals. One of these proxy functions can be the base station controller for whatever air interface exists within an access point. This proxy function, acting as the base station controller, communicates at the IP level with an IP gateway 325. The IP access router 313 also executes AAA functions that will be described later.

Referring to FIG. 3A, in the present invention, an IP gateway 325 carries traffic toward the Internet or public networks, terminates mobile IP tunnels, and performs signaling transformations as needed. The IP gateway 325 may comprise single or multiple gateways as the implementation requires.

As an alternative to signaling transformations, encapsulated SS7 or ISDN control signals, as well as H.323, SIP, or other IP network-oriented signals can be transparently conveyed through the IP gateway 325.

The IP gateway 325 can be coupled to various outside networks. For instance, the IP gateway 325 can be connected to another mobile network or a public switched telephone network. The IP gateway 325 is also connected through an ISP network 340 to the server 341 of the virtual operator. Resident on the server 341 of the virtual operator is a directory of end-user public keys 342 that are used for authentication and encryption as discussed below.

In the present invention, virtual operator LAN (VOLAN) technology is used to configure logical service networks across geographical LAN segments for different virtual operators. Within each virtual operator's VOLAN, QoS can be supported for different levels of subscriber services.

The present invention utilizes standards-based virtual LAN and QoS features appearing in the Ethernet switch that is the core of each PAMLAN segment. Although the Ethernet MAC protocol is still CSMA/CD, a full duplex Etherswitch operates with no contention, and new standards have been introduced to provide 802.1p packet prioritization and virtual LAN (IEEE 802.1Q).

Finally, new IP local mobility protocols for the wireless LAN environment, such as cellular IP and HAWAII, will improve the performance of mobile IP. In particular, these new protocols will provide faster handoffs, more direct traffic routings and more distributed and scalable connection control.

The new IP local mobility protocols are easily incorporated into the present invention. Referring to FIG. 3A, the IP gateway 325 becomes a relatively fixed address for the visiting mobile subscriber. Therefore, only the inter-segment gateway router 302 internal to the PAMLAN have to be informed about path changes due to movement of the mobile subscriber from one local access point to another local access point. Even this requirement reduced by use of MPLS. Thus, a mobile appliance obtains an IP address dynamically when it enters a PAMLAN according to the present invention. The mobile appliance can then freely roam across the geographical LAN segments (i.e., LAN segment 1 and LAN segment 2) within the PAMLAN without requiring a new IP address assignment as the geographical LAN segments are traversed.

In order to provide public Internet access, the necessary protocol components must be in place in the core access network of the present invention, the access points, and the visiting Internet appliances. As noted above, the core network of the present invention provides micro-mobility, virtual LAN and Dynamic Host Configuration Protocol (DHCP) services.

Figure 5A:
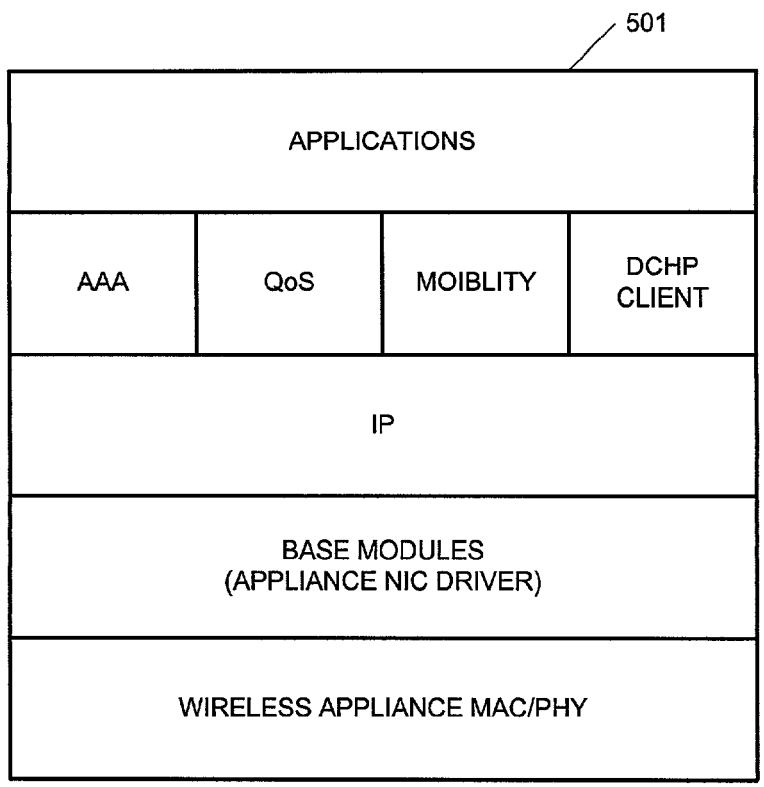
FIGS. 5A and 5B illustrate the protocol stacks employed by the present invention for an air access points and a wireless appliance.
Figure 5B:
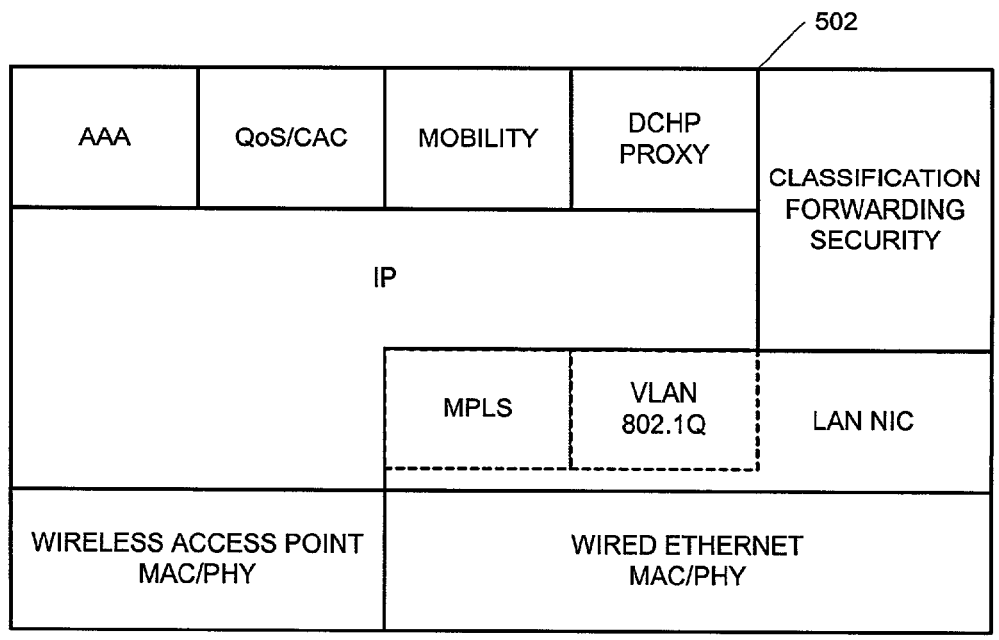

Referring to FIGS. 5A and 5B, the protocol stack of a wireless appliance 501 and the protocol stack of an air access point 502 are illustrated. The access points host several protocol components, such as DHCP proxy, agents for distributed AAA, packet filtering and classification, QoS control, and mobility management. Because the access point is router-based, these PAMLAN functions can be implemented at layer 3 and above, requiring no wireless MAC protocol changes. The router approach of the present invention also avoids changes to the protocol stacks in the mobile appliances. Instead, the present invention relies on existing protocol components (e.g., DHCP client, IPSec) or implemented in the application layer (e.g., authentication session). The present invention combines MPLS and virtual LAN (VLAN) in the access point, thereby forming a virtual operator LAN that supports the PAMLAN QoS and mobility functions.

When the present invention is implemented as a single switched LAN, the VOLAN is simply implemented as a VLAN by tagging all traffic of the VOLAN (i.e., of visitors associated with a particular virtual operator) with the assigned VLAN ID. The QoS provisioning for the mobile subscribers can be implemented using an IEEE 802.1p header, a 3-bit section embedded in the EEE 802.1Q header to differentiate eight frame priorities.

However, in a large implementation with multiple routers interconnecting multiple subnetworks, VLAN alone is no longer adequate for VOLAN provisioning. In such an environment, a VOLAN can be implemented as a chain of VLANs connected by gateway routers. These routers map a virtual operator packet to a VLAN tag when forwarding the packet into a subnetwork, thereby maintaining the VOLAN coherence. Since the gateway router works at layer 3, all VLAN information from the layer 2 header is lost when a packet crosses subnetworks. Therefore, it is not possible for the router to maintain a VLAN mapping table between adjacent subnetworks. Instead, the routers must use layer 3 information such as source and destination IP addresses to determine VOLAN membership for a packet.

There are, however, problems with this approach. In particular, all the intermediate routers in the PAMLAN have to keep all the IP addresses (at least the address prefixes) of the active mobile subscribers in order to make VLAN mapping decisions. Further, because of the hop-by-hop nature of IP routing, it is difficult to effectively manage and provide service provisioning for different VOLANs. For these reasons, the present invention uses MPLS together with VLAN for VOLAN provisioning.

MPLS provides a simple and efficient solution in which the access points and the Internet gateways handle the VOLAN provisioning while all the intermediate routers are shielded from the VOLAN details. In the present invention, combining MPLS and VLAN together provides an elegant VOLAN solution. According to the present invention, inside each LAN segment, VLAN is used to group traffic per virtual operator. With the whole PAMLAN, MPLS is used to set up routing paths and provision each VOLAN.

Multi-Protocol Label Switching (MPLS), as its name indicates, is a protocol designed to provide a convergence layer for various connectionless network layer protocols over a multitude of link layer protocols. While its original purpose was to increase packet forwarding efficiency and speed in an IP over ATM or Frame Relay scenario, it actually thrives on its promise in facilitating traffic engineering. It achieves this by organizing connectionless layer 3 traffic into traffic engineered tunnels, or in the MPLS term, Label Switched Paths (LSP). Before a packet gets into an MPLS domain, a label stack is inserted before its network layer header to serve as a local identifier for an LSP. MPLS routers are called Label Switching Routers (LSR), with the two routers at the ends of an LSP referred to as the ingress LSR and the egress LSR, respectively. Packets are classified into Forwarding Equivalence Classes (FEC). Depending on the actual needs, FECs may be classified with different granularity. For example, an address prefix could correspond to one FEC, or a combination of source address/port number and destination address/port number can be used to designate all traffic between two end points as one FEC. At any LSR, incoming traffic belonging to the same FEC will be treated equally, i.e., sent out to the same interface with the same label. At the ingress router, a packet is assigned a label according to the FEC to which it belongs. When a labeled packet arrives at an intermediate router along an LSP, a process called label swapping is performed: The label in the packet is first extracted and the pair of (incoming port, incoming label) is map into a pair of (outgoing port, outgoing label). The incoming label is then replaced with the outgoing label in the MPLS packet and the packet is sent out to the outgoing interface. This process is repeated until the packet reaches the egress router where the MPLS label is stripped off the packet and the packet is forwarded through regular layer 3 forwarding. For label mapping purposes, Next Hop Label Forwarding Entries (NHLFE) are used at the LSRs. Each NHLFE contains the outgoing interface, the operation on the label stack and optionally, the layer 2 encapsulation for transmitting the packet. At the ingress LSR, an FEC-To-NHLFE (FTN) map is used for label creation. At each intermediate LSR, an Incoming Label Map (ILM) converts incoming labels into corresponding NHLFEs to converts the MPLS packets accordingly.

In an MPLS domain, a packet is tagged with a label at its ingress point into the domain and forwarded within the domain by using the label. At the egress point, the label is removed and the packet returns to its original form. In effect, an LSP is set up between the ingress and the egress points for transmission of packets between these two points. Because of the tunneling effect, it is no longer necessary to use the intermediate routing tables to make forwarding decisions for IP packets destined for a mobile terminal.

For a mobile terminal, its access point is its entry point into the PAMLAN and the gateway is its entry point into the Internet. Most of its traffic travels between these two points, as well as between the access points in the PAMLAN for communication among mobile terminals. With MPLS supported inside the PAMLAN, we can view the whole PAMLAN as a single MPLS domain. The gateway and the access points are naturally the ingress or the egress points (depending on the direction of the traffic) with respect to the mobile terminal traffic. Because mobile terminals use their access points as the edge LSRs into the MPLS domain, intermediate routers inside the domain do not have to be aware of any of the mobile terminals when setting up the label forwarding tables. This makes it possible for the intermediate routers to only set up label bindings for the access points and the gateway, thus avoiding the update of the label tables in any of the intermediate routers when mobile terminals move to different access points.

Figure 9:
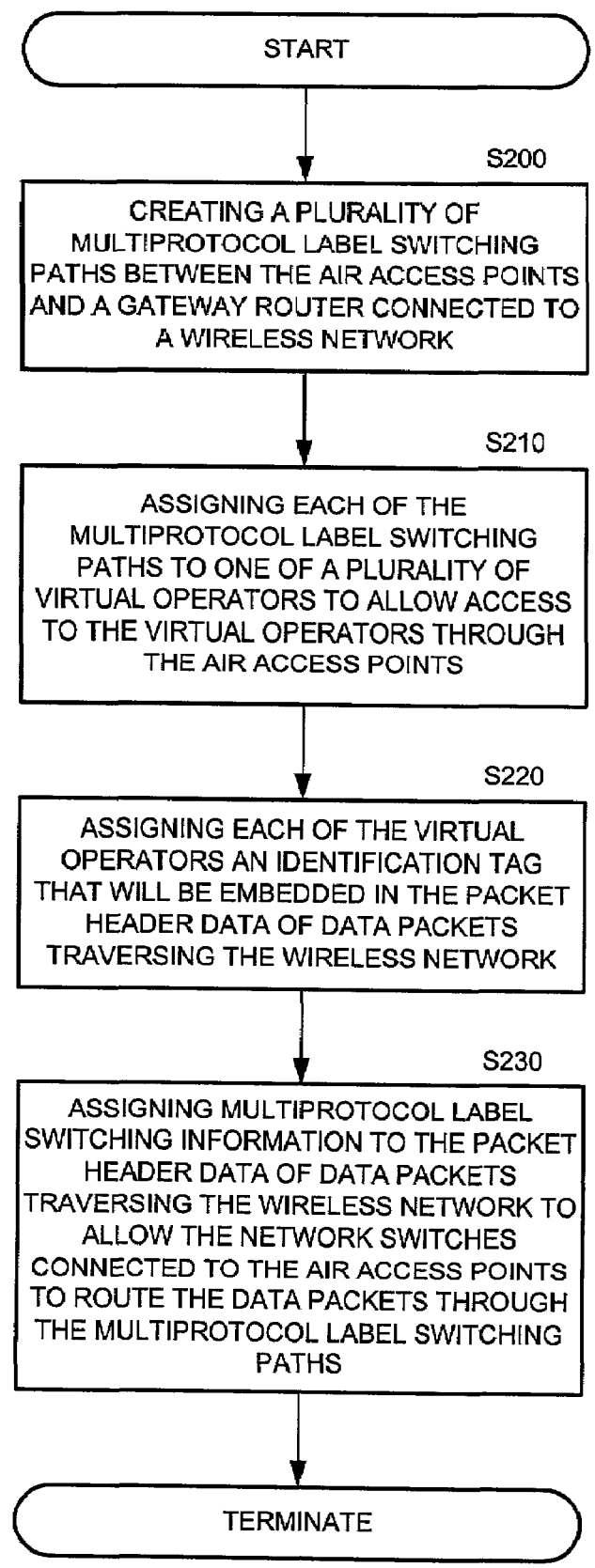
FIG. 9 is a flowchart illustrating the creation of Multiprotocol Label Switching Paths in the present invention and the assignment of Multiprotocol Labels and virtual operator identification tags.

Referring to FIG. 9, an exemplary flowchart is shown illustrating an exemplary method of operating a PAMLAN network in which mobile services are provided by a plurality of virtual operators. As discussed above, the PAMLAN network comprises a plurality of subnetworks, and each subnetwork comprises one or more network switches. The air access points in the subnetworks are comprised of an air interface, an access control module and a router, and the router is coupled to the network switches. Communication between subnetworks is achieved by routers connected to the network switches of each of the subnetworks. Access to outside networks is accomplished though gateway routers connected to the subnetworks. At S200, a plurality of MPLS paths between the air access point in each subnetwork and the gateway routers is created. At S210, the MPLS paths are assigned to one or more of the a plurality of virtual operators so that the virtual operators can be accessed through the air access point of each of the subnetworks. Thus, several virtual operators could be accessed through one air access point, or only one virtual operator could be accessed through a given access point. At S220, each virtual operator is assigned an identification tag, and that identification tag is embedded in a packet header of data that is traversing the wireless network. At S230, MPLS information is added to the headers of data packets traversing the wireless network. This allows the network switches of the subnetworks to route the data packets through the MPLS paths based on the headers of the data packets.

Figure 4:
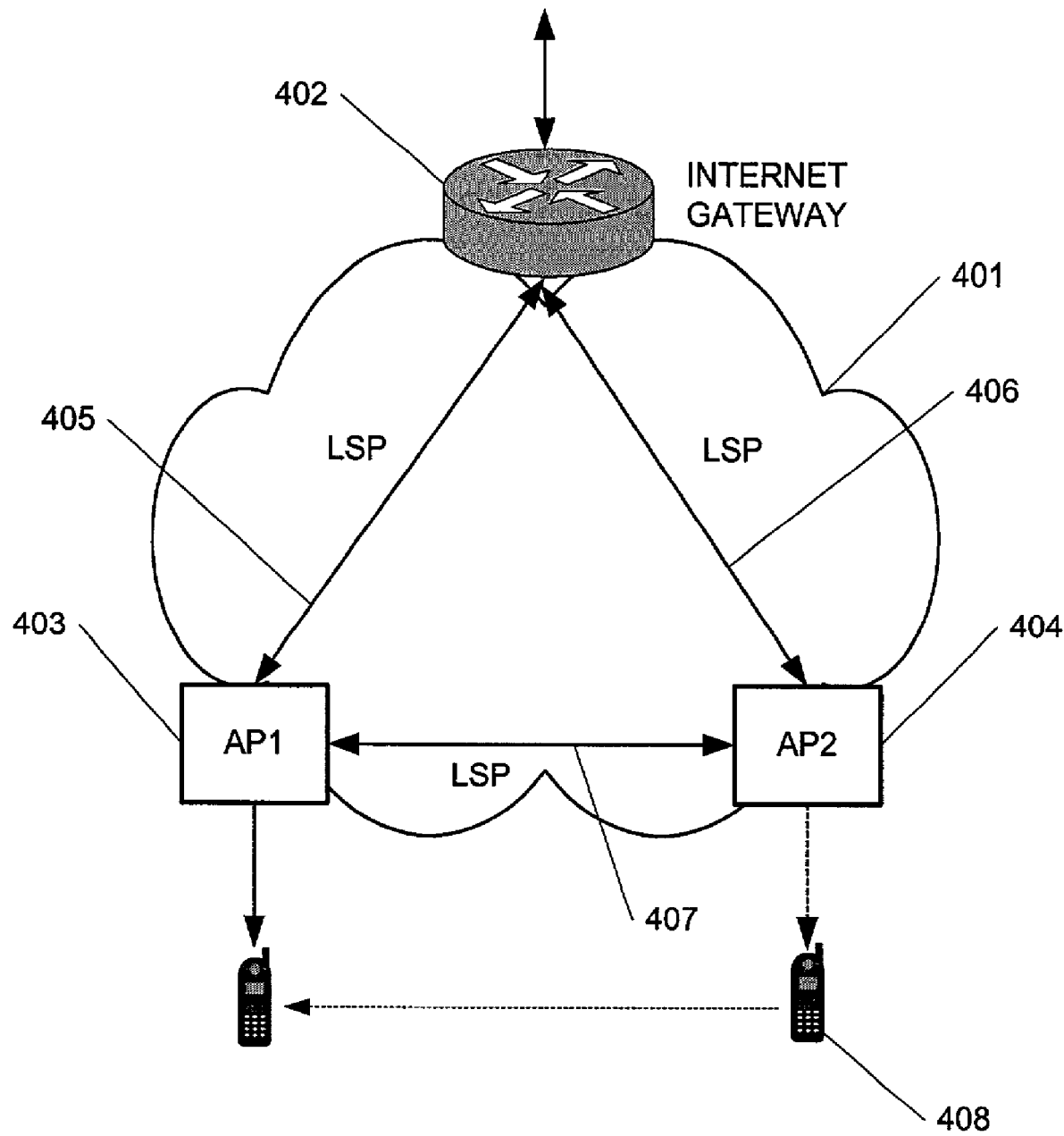
FIG. 4 illustrates the use of Label Switched Paths in an exemplary embodiment of the present invention.

Refering to FIG. 4, an abbreviated PAMLAN 401 is illustrated to show how MPLS is used in a PAMLAN to support micro-mobility. When a mobile terminal 408 enters a PAMLAN 401, it associates with an access point 404 (denoted as access point$_1$) and is dynamically assigned an IP address (denoted as IP$_{mt}$) through DHCP. Such an address is allocated from a pool of addresses reserved for mobile terminals in the PAMLAN 401. Immediately after this address assignment, the access point 404 notifies all the other border routers 402 in the PAMLAN about this new mobile terminal (and thus the IP address). The IP gateways 402 and the access points 403, 404 then update their FEC-To-NHLFE (FTN) maps accordingly. Each mobile terminal IP address corresponds to a new FEC in these maps. The following procedure is used at the border routers to properly update the FTN map:

1. If there is no entry for IP$_{mt}$ in the map yet, create a new one.
2. Find the entry for access point$_1$ in the map, denote its NHLFE as NHLFE$_1$.
3. Update the NHLFE part of the entry for IP$_{mt}$ to NHLFE$_1$.

In this way, when the gateway 402 or an access point 403, 404 receives a packet destined for the mobile host, it checks its FTN map and chooses a label that corresponds to the same LSP 406 as the one to the access point 404 (access point$_1$). The labeled packet can thus be forwarded to access point 404 (access point$_1$) by the intermediate routers only through label translation and without any routing. This ensures that the packet be correctly forwarded even without the intermediate routers being aware of the location of the mobile terminal 408. When the packet reaches access point 404 (access point$_1$), the label is stripped and the access point 404 has a regular IP packet to be forwarded to the mobile terminal 408.

When the mobile terminal 408 moves to a new access point 403, the same procedure is followed to update the FTN maps in the gateway 402 and the other access points 403, 404. One difference, however, is that some packets for the mobile terminal 408 may be forwarded to the old access point 404 during the transition, i.e. before the FTN maps are properly updated at the gateway 402 or the other access points. MPLS actually helps alleviate this problem: according to the update procedure, after the mobile terminal 408 reassociates with a new access point 403, the FTN map at the old access point 404 is modified to forward all packets destined to the mobile terminal 408 to the new access point 403. Thus, any packets that are incorrectly forwarded to the old access point 404 during the transition would be immediately forwarded to the new access point 403.

In the current MPLS deployment, MPLS neighboring routers usually have point to point connections, thus the MPLS forwarding process only needs to determine the outgoing interface and a new label for each packet. The packet will then be sent to the neighboring router connected through the outgoing interface. Therefore, each entry in the ILM maps an (incoming label, incoming port) pair to an (outgoing label, outgoing port) pair. In a PAMLAN environment, neighboring routers may be connected through a switched Ethernet LAN. Thus a physical port is no longer sufficient to identify the neighboring router. In such a case, each NHLFE contains the MAC address of the neighboring router in addition to the physical interface. When a router receives a MPLS packet, the incoming label is first replaced with the outgoing label. The Ethernet header containing the MAC address found in the ILM is then added to the packet to form an Ethernet frame and sent out through the outgoing interface into the Ethernet LAN.

Figure 6:
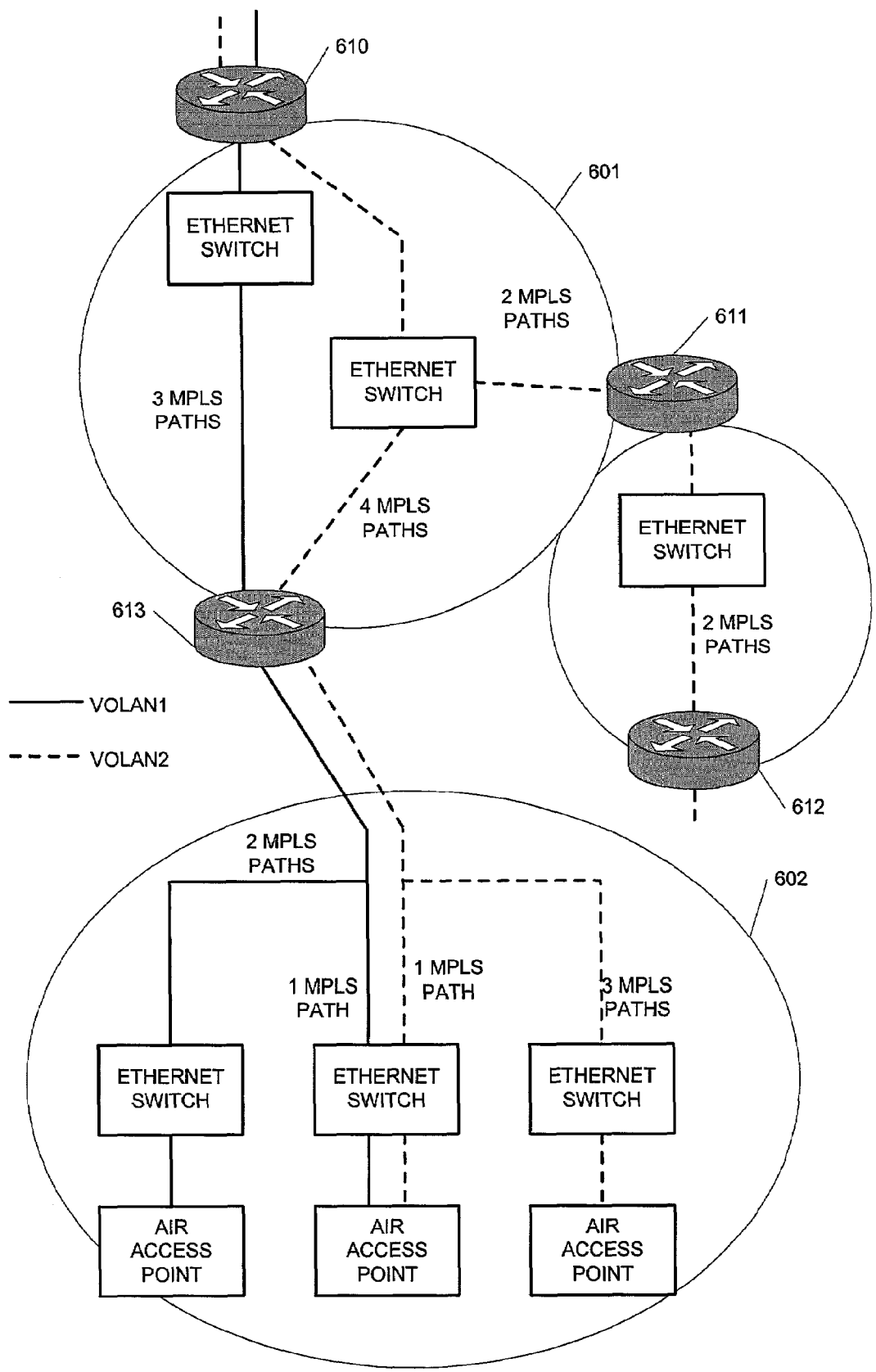
FIG. 6 illustrates an exemplary embodiment of the invention with Multiprotocol Label Switching Paths for multiple virtual operators.

Referring to FIG. 6, an exemplary architecture according to the present invention for a 3-segment LAN with two VOLANs is illustrated. In FIG. 5, VOLAN 1 has three MPLS paths from access point routers to PAMLAN gateway routers, and VOLAN 2 has four MPLS paths. LAN segment 1 (602) comprises several air access points. LAN segment 2 (601) is shown with only Ethernet switches; however, LAN segment 2 (601) could also comprise several air access points as well. LAN segment 3 (600) is shown with only Ethernet switches; however, LAN segment 3 (600) could also comprise several air access points as well. Inter-segment gateway routers 611, 613 connect LAN segment 1, LAN segment 2 and LAN segment 3 together. Two PAMLAN gateway routers 610, 612 are connected to the Ethernet switches of LAN segment 2 and LAN segment 3. VOLAN 1 has three MPLS paths (or tunnels) provided through LAN segment 2 (601) and reaching the air access points in LAN segment 1 (602). Within LAN segment 1 (602), the MPLS paths are distributed to some (but not all) of the air access points provided in the LAN segment. The Ethernet switches implement the MPLS paths to the various air access points. As shown in FIG. 6, multiple MPLS paths for one VOLAN can be routed to a single air access point, or multiple MPLS paths for multiple VOLANs can be routed to a single air access point. Also, multiple MPLS paths from different gateway routers can be congregated together within a single LAN segment. As shown in FIG. 6, two MPLS paths for VOLAN 2 are routed through one gateway router 612, and two other MPLS paths for VOLAN 2 are routed through another gateway router 610. In LAN segment 2 (601), the four MPLS paths are congregated together and routed to LAN segment 1 (602) through the inter-segment gateway router 613.

The clouds in FIG. 6 are subnetworks that are interconnected through routers. They are drawn in small sizes only because of the space limitation. In reality, these subnetworks could be fairly large and complex with hundreds of nodes grouped into a large number of VLANs. Adjacent routers are connected with each other through the cloud (subnetwork) they both belong to. As we can see from FIG. 6, a VOLAN is mapped from one cloud to another by the interconnecting router.

The use of MPLS makes it possible to limit VOLAN management at the "borders" of the PAMLAN. Only Internet gateways and the access points need be aware of the existence of VOLANs. MPLS tunnels are built among them to direct mobile subscriber traffic in a systematic way without routing function changes in the intermediate PAMLAN routers. These routers examine only the MPLS label, which carries information regarding a VOLAN path between the source and the destination border router.

In essence, the use of MPLS for VOLAN support is very similar to the case of micro mobility support and both solutions can be easily integrated into PAMLAN. In both cases, MPLS paths need to be set up among the border routers that serve as ingress and egress LSRs for the MPLS domain. There are, however, some noticeable differences:

1. Each FEC is no longer identified by a single IP address prefix, but by a pair of (IP address prefix, VOLAN id). This means that multiple LSPs may need to be established between two border routers with each LSP carrying traffic belonging to one virtual operator.
2. On a border router, the FTN entry for a mobile terminal is determined according to its associated access point and its current virtual operator. In order to easily map a mobile terminal address to its corresponding virtual operator, the DHCP server should assign IP addresses on a per virtual operator basis. Note that it is possible that a mobile terminal may belong to multiple VOLANs (multiple virtual operators). In such a case, it may use different interfaces to identify different VOLAN membership with each interface being assigned an IP address.
3. On an intermediate router, the virtual port contained in each entry of the LIM needs to be augmented with a VLAN tag. This tag identifies the virtual operator in the switched Ethernet LAN the packet will be sent into in order to reach the next neighboring router.

At an access point, each mobile subscriber packet is mapped into a Forwarding Equivalence Class (FEC) based on virtual operator membership and the desired QoS class. An MPLS label conveying the FEC information is inserted into the packet and is used by the Label Switched Routers along the MPLS path to determine VLAN assignment as well as 802.1p priority within each VLAN. Traffic engineered paths can be set up among access points and Internet gateways according to the service contracts between the PAMLAN and different virtual operators.

When a mobile subscriber attempts to access wireless services via the present invention, the access point must make ensure that the mobile subscriber is authorized to access the wireless services and can be properly charged for wireless services rendered. Simultaneously, the mobile subscriber must ensure that the PAMLAN is trustworthy (or semi-trustworthy) and is certified by the mobile subscriber's service provider. According to the present invention, the mobile subscriber's service provider has a virtual operator franchise in the PAMLAN. In addition, both the mobile subscriber and the PAMLAN must ensure that the transmission between them is secure and that no one can fake the mobile subscriber's identity in order to gain unauthorized access.

The present invention provides a security framework that addresses the above-described concerns. In an exemplary embodiment of the security framework, there are provided four major components:

1. Mutual authentication between the mobile subscriber and the virtual operator through RADIUS (Remote Authentication Dial-In User Service) with the access point serving as the RADIUS client. The virtual operator's RADIUS server also certifies the access point, so that the mobile subscriber and the access point will enjoy a reasonable level of mutual trust.
2. Public key based secure channel establishment between the mobile subscriber and the access point. Each mobile subscriber has a public key in a directory maintained by the virtual operator. After mobile subscriber (and access point) authentication, the virtual operator sends this key to the access point. The access point then generates the session key, encrypts the session key using the mobile subscriber's public key and sends the encrypted session key to the mobile subscriber.
3. Per packet encryption for authenticated sessions. Once the mobile subscriber obtains the per session key, all mobile subscriber traffic is encrypted at the IP layer using IPSec, or at layer 2 using hardware encryption if the layer 2 protocol implementation (e.g., IEEE 802.11) at both the appliance and the access point supports per session keys.
4. A filtering function at the access point to control traffic from the mobile appliances. The access point filters each packet and determines whether the packet should be let through (user traffic authenticated with the session key), sent to the authentication engine (login session traffic), or blocked (unauthorized traffic). This filtering function is a fundamental building block used for many other purposes such as VLAN assignment and QoS control.

The authentication scheme of the present invention is similar to that in an IEEE 802.11 draft proposal submitted by Cisco, Microsoft, Intel, Symbol and Informed Technology. However, unlike the IEEE 802.11 draft proposal, the security framework of the present invention uses a pure IP-based solution. The IEEE 802.11 draft proposal uses an IEEE 802.1x port based authentication scheme, which requires minor changes to both IEEE 802.11 and 802.1x standards.

The IP-based security framework of the present invention operates across different radio technologies without the need to change layer 2 protocols, which are usually built into hardware and are not easy to modify. The IP-based security framework enables access points to inter-operate with wireless interface cards from different vendors, which may have their own proprietary AAA schemes. All that is required for interoperability is to install the necessary application-level authentication software on the wireless appliance.

In the present invention, a mobile appliance associates with an access point through open authentication. The access point then assigns the mobile appliance a dynamic IP address via DHCP and also installs a filter for the assigned IP address. All IP traffic from this dynamic IP address is initially terminated by the access point filter and sent to the authentication engine. After the IP stack is properly set up at the mobile appliance, the mobile subscriber initiates a login session with his/her service provider (virtual operator) through the access point. If the service provider has a partnership agreement with the PAMLAN, then the access point, serving as a RADIUS client, can initiate a RADIUS session with the virtual operator's RADIUS server. By employing a challenge/response scheme and using the access point as a relay agent, the mobile subscriber and the service provider's RADIUS server authenticate each other through RADIUS protocol message exchange.

Figure 7:
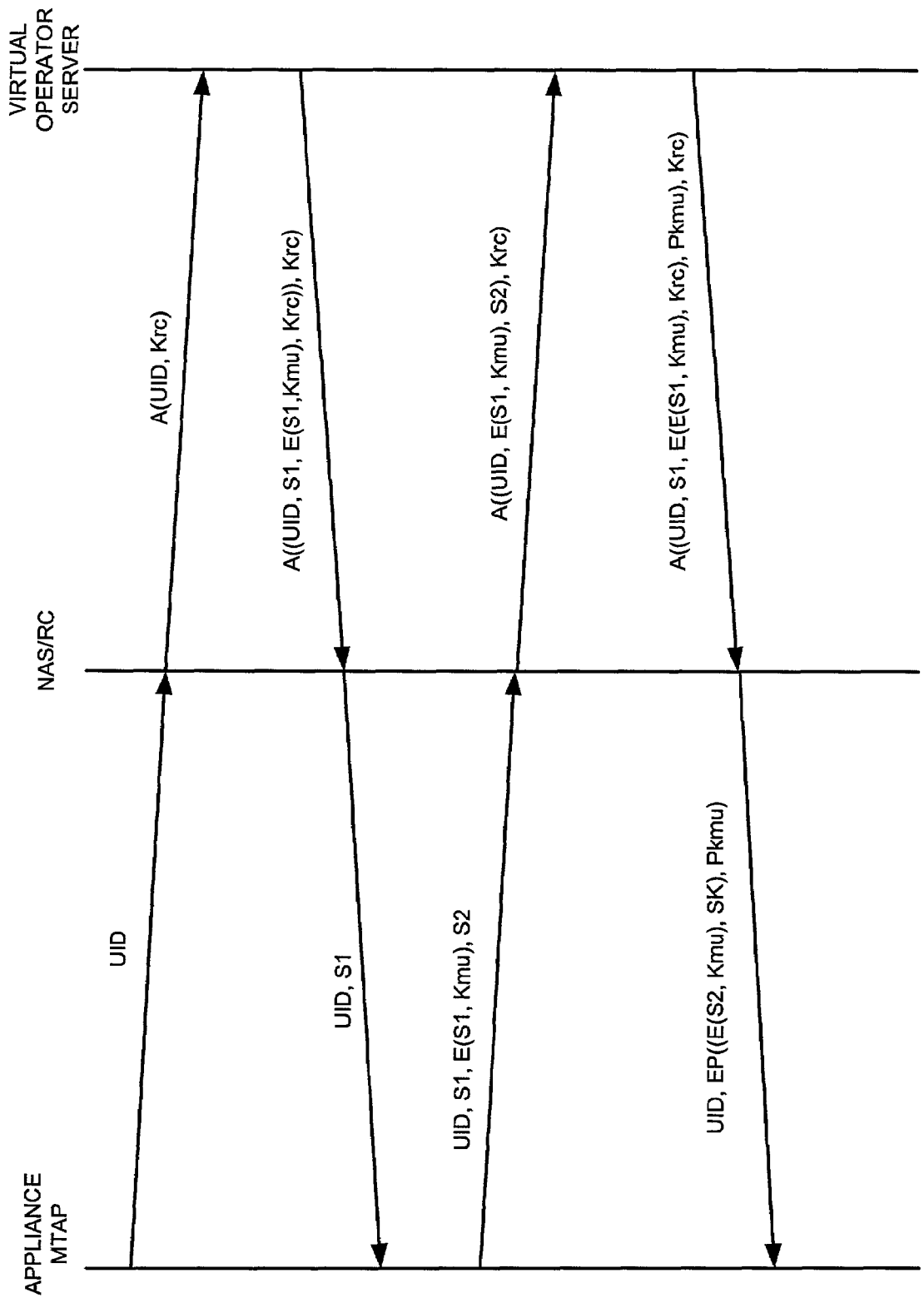
FIG. 7 illustrates an authentication protocol utilized by the present invention to authenticate a mobile subscriber attempting to access a wireless network of the present invention.

Referring to FIG. 7, an exemplary embodiment of the authentication sequence between the mobile subscriber and the service provider's RADIUS server is illustrated. The result of such a mutual authentication is that the mobile subscriber and the access point can now trust each other with respect to the service provider agreement. With this assurance, the access point can then request the service provider to send the mobile subscriber's profile, including the mobile subscriber's public key and subscription status. The public key is used to securely inform the mobile subscriber of the session key while all other parameters in the profile are used to enforce the virtual operator's access and QoS policies for the mobile subscriber traffic.

Figure 8A:
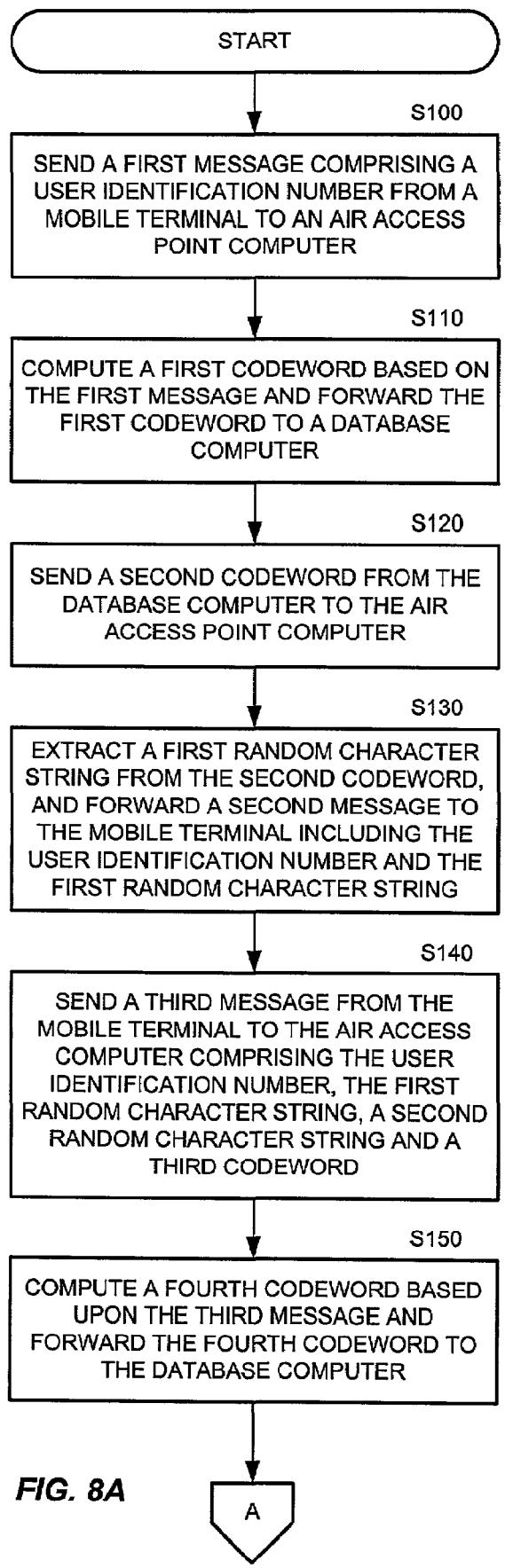
FIGS. 8A and 8B is a flowchart illustrating the authentication protocol utilized by the present invention to authenticate a mobile subscriber attempting to access a wireless network of the present invention.
Figure 8B:
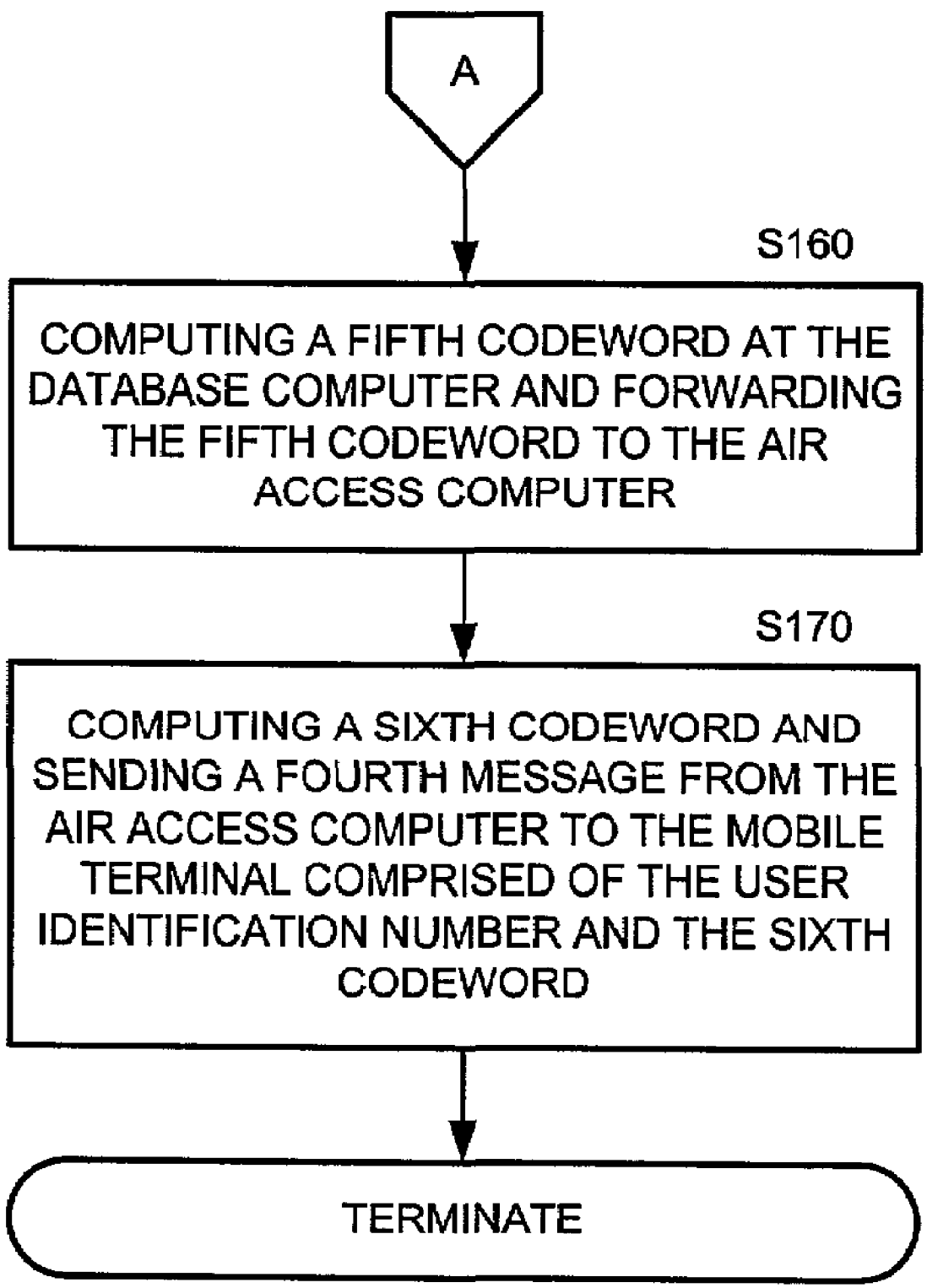

Referring to FIGS. 7, 8A and 8B, the authentication process is described in greater detail. At S100, the mobile terminal sends a first message to the air access computer having a user identification number (UID). After receiving the first message, at S110, the air access computes a first codeword, and forwards the first codeword to the database computer. The function A(UID, Krc) produces a codeword from the authentication encryption of the message UID using the secret key (Krc) shared between the air access computer and the database computer. Next, at S120, the database computer of the virtual operator server sends a second codeword to the air access point computer. The second codeword results from an authentication encryption function A((UID, S1, E(E(S1, Kmu),Krc)), Krc), wherein S1 is a random string generated by the mobile subscriber, Kmu is a secret key shared between the mobile user and the database computer and Krc is a secret key shared between the air access computer and the database computer. Next, at S130, the authentication method extracts the first random character string S1 from the second codeword, and sends a second message comprising the user identification number UID and the first random character string S1 to the mobile terminal. At S140, the mobile terminal sends to the air access computer having the user identification number UID, the first random character string S1, a second random character string S2, and a third codeword resulting from a security encryption of the first random character string S1 and the shared key Kmu. At S150, the air access computer computes a fourth codeword based on the third message received from the mobile terminal using a security encryption of the third message and the shared key Krc, and sends the fourth codeword to the database computer. At S160, the database computer computes a fifth codeword using the user identification number UID, the first random character string S1, the shared key Krc, the shared key Kmu and the mobile subscriber's public key Pkmu. The database computer sends the fifth codeword to the air access computer. At S170, the air access computer computes a sixth codeword using an security encryption of the second random character string S2 and the mobile subscriber's public key Pkmu, and sends a fourth message to the mobile terminal comprised of the user identification number and the sixth codeword.

After successful authentication and per session key establishment, the mobile subscriber can use the PAMLAN to access the public Internet or local resources (e.g. printing services, temporary storage spaces and caching services). The filtering function at the access point plays an important role in controlling user access and in enforcing a rich set of access policies.

The most basic access policy provided by the present invention is a per-packet authentication/encryption policy that maps an authenticated mobile appliance IP address to the corresponding session key. This corresponding session key is used to authenticate and/or decrypt the IP packets from the mobile appliance. Stored in the mobile subscriber's profile is a security level that is set by the mobile subscriber. Depending on the level of security in the mobile subscriber's profile, mobile subscriber packets can be simply authenticated using IPSEC authentication headers. An IPSEC authentication header authenticates the mobile subscriber packets by generating a codeword over the whole packet plus the session key and appending the result to the IPSEC authentication header. Since only an authenticated mobile appliance shares a session key with the access point and can generate the correct authentication header, secure per-packet authentication can be performed.

The per-packet authentication/encryption policy of the present invention is sufficient to deter fake identity attack wherein an unauthorized mobile subscriber fakes the IP address of another mobile subscriber in order to gain PAMLAN access. However, per-packet authentication/encryption policy does not protect the security of the packet content. If the mobile subscriber is concerned about eavesdropping, the present invention uses the IPSEC Encapsulated Security Payload (ESP) to encrypt the IP payload. Alternatively, the present invention also uses end-to-end approaches, e.g., secure socket.

Additional policies supported by the present invention comprise (1) providing access only to certain types of subscriptions with authorized services providers; (2) providing free access together with advertisements; (3) excluding access to particular Internet sites (i.e., parental control); and (4) imposing a service provider's QoS limitations (e.g., a limit on access rate).

With the help of a traffic filtering function, the present invention also collects per-user accounting information. In one embodiment, the access points collect the per-user accounting information and sent the collected information to the RADIUS server of the virtual operator (i.e., service provider). Accounting information may comprise session duration, a detailed list of requested services, a detailed list of visited sites, total session duration and level of service provided. To obtain the most accurate accounting information, the service provider would have to route all mobile subscriber traffic through its own location, or the location of a trusted entity in the Internet.

Alternatively, several locally-operating mechanisms corresponding to different contractual and subscription agreements may be employed:

1. Flat fee based: a PAMLAN operator charges each virtual operator a flat fee to provide unlimited access to the mobile subscribers belonging to the virtual operator. In turn, the virtual operator charges each mobile subscriber a flat monthly fee. A loose accounting scheme is used, e.g., only the access points keep track of the mobile subscriber traffic and report to the virtual operator periodically.
2. Per session: the virtual operator is satisfied with proof of mobile subscriber login and signoff.
3. Usage based: the mobile subscriber is only charged for the actual traffic his/her mobile appliance generates on a PAMLAN. To avoid possible dispute, the virtual operator must have digitally signed (authenticated) evidence that the mobile subscriber and the access point measured the same traffic usage.

Mobility management becomes a significant issue in large implementations of the present invention having multiple subnetworks. Because the present invention works as a layer 3 infrastructure, mobility requirements, such as dynamic path routing and fast AAA handoff in particular, must be supported at the IP layer.

Micromobility refers to roaming within a PAMLAN environment. It should not be necessary to follow the full mobile IP procedure of rerouting through the Internet to the mobile subscriber's home location when only a local movement is made.

Cellular IP was designed for micromobility support in a LAN environment with multiple router-based access points and a single Internet Gateway. When a mobile appliance moves and changes its associated access point, a routing update message is sent from the mobile appliance through the new access point toward the Internet gateway. Each router along the way, like the access point and the Internet gateway, updates its routing table to reflect this change. These routing entries are refreshed periodically, so that if there is a pause in regular packet transmission, the mobile appliance must periodically send location update packets (paging packets) to prevent the routing table entries from expiring. The whole process is a significant burden when a PAMLAN is servicing a large number of mobile appliances.

For micromobility, the present invention uses MPLS Label Switched Paths (LSPs) between Internet gateways and access points to handle mobile traffic. Access points and Internet gateways serve as ingress or egress routers, depending on the direction of the mobile traffic. If LSPs are statically provisioned between access points and Internet gateways, there is no need to update any intermediate routers when mobile appliances move. Only the old access point, the new access point and the Internet gateway need be informed of the change to redirect mobile traffic through a different LSP. Apart from efficient micro-mobility support, this feature of the present invention also, as described earlier, provides a way to provision virtual operator LANs.

In the PAMLAN environment of the present invention, is undesirable to make a mobile subscriber repeat the authentication process each time the mobile subscriber associates with a new access point for both inconvenience and traffic interruption reasons. It is thus necessary that the state of the AAA controls be smoothly transferred from the old access point to the new access point. A fast and smooth handoff is possible provided that the old access point trusts the new access point. This is a feature of the present invention. The present invention executes the following steps to ensure a fast handoff:

1. The new access point fetches the mobile subscriber profile from the old access point. Among other things, this mobile subscriber profile contains the mobile subscriber's public key, the old session key that the mobile subscriber shared with the old access point, the mobile appliance's IP address and all the access policies associated with the old session.
2. The old access point signals to the RADIUS server the termination of the current accounting session.
3. The new access point generates a new session key, encrypts this new session key and the mobile subscriber's old session key using the mobile subscriber's public key and sends the result to the mobile subscriber in a UDP packet. Upon receiving the packet, the mobile subscriber decrypts these keys and compares the old session key with the new session key. If the two match, the mobile subscriber uses the new session key to establish a secure connection with the access point.
4. The new access point installs the filtering functions, together with the access policies in the mobile subscriber profile. The new access point initiates a new accounting session with the RADIUS server.

The foregoing description of the aspects of the present invention has been presented for purposes of illustration and description. It is not intended to be exhaustive or to limit the present invention to the precise form disclosed, and modifications and variations are possible in light of the above teachings or may be acquired from practice of the present invention. The principles of the present invention and its practical application were described in order to explain the to enable one skilled in the art to utilize the present invention in various embodiments and with various modifications as are suited to the particular use contemplated.

Thus, while only certain aspects of the present invention have been specifically described herein, it will be apparent that numerous modifications may be made thereto without departing from the spirit and scope of the present invention. Further, acronyms are used merely to enhance the readability of the specification and claims. It should be noted that these acronyms are not intended to lessen the generality of the terms used and they should not be construed to restrict the scope of the claims to the embodiments described therein.

What is claimed is:

1. A wireless network, comprising:
   a plurality of subnetworks, each subnetwork comprising:
   at least one network switch; and
   at least one air access point comprised of an interface, an access control module and an air access point router, wherein the air access point router is coupled to the network switch;
   at least one router that is connected to the network switch of each of the plurality of subnetworks; and
   at least one gateway router that is connected to the plurality of subnetworks;
   wherein said wireless network is operated by a plurality of virtual operators and access to services provided by each of the virtual operators is supported by using multiprotocol label switching.

2. The wireless network as claimed in claim 1, wherein the gateway router is coupled to a mobile telephone network.

3. The wireless network as claimed in claim 1, wherein the gateway router is coupled to a public switched telephone network.

4. The wireless network as claimed in claim 1, wherein the gateway router is coupled to a network operated by a service provider.

5. The wireless network as claimed in claim 4, wherein the service provider is a virtual operator.

6. The wireless network as claimed in claim 5, wherein a server having a database of mobile subscriber public keys is coupled to the network operated by the service provider.

7. The wireless network as claimed in claim 6, wherein the access control module authenticates a mobile subscriber that is accessing the wireless network by requesting subscriber public keys stored in the database.

8. The wireless network as claimed in claim 1, wherein the at least one gateway router is a plurality of gateway routers.

9. The wireless network as claimed in claim 1, wherein the access module of each of the air access points authenticates a mobile subscriber attempting to access the wireless network through the air interface coupled to the access module.

10. The wireless network as claimed in claim 9, wherein a mobile subscriber is assigned an IP address dynamically when the mobile subscriber accesses the wireless network.

11. A wireless network operated by a plurality of virtual operators, comprising:
a plurality of subnetworks, each subnetwork comprising:
at least one network switch; and
at least one air access point comprised of an air interface, an access control module and a router, wherein the router is coupled to the network switch;
at least one router that is connected to the network switch of each of the plurality of subnetworks; and
at least one gateway router that is connected to the plurality of subnetworks,
wherein access to services provided by each of the virtual operators is supported by using multiprotocol label switching to route mobile subscriber data between the at least one gateway router and the plurality of subnetworks.

12. The wireless network as claimed in claim 11, wherein at least one of the subnetworks has at least one multiprotocol label switching path so at least one of the virtual operators can be accessed through the air access point of the subnetwork.

13. The wireless network as claimed in claim 11, wherein each of the subnetworks has at least one multiprotocol label switching path so at least one of the virtual operators can be accessed through the air access point of each of the subnetworks.

14. The wireless network as claimed in claim 11, wherein each of the subnetworks has a plurality of multiprotocol label switching paths so a plurality of virtual operators can be accessed through the air access point of each of the subnetworks.

15. The wireless network as claimed in claim 11, wherein each of the plurality of virtual operators is assigned an identification tag that is embedded in a packet header of data that is traversing the wireless network.

16. The wireless network as claimed in claim 11, wherein tunnels based on multiprotocol label switching are provided between the at least one gateway router and the air access point in at least one of the subnetworks.

17. The wireless network as claimed in claim 16, wherein the headers of data packets traversing the wireless network are assigned multiprotocol label switching information, and the network switches of the subnetworks route the data packets through the tunnels based on the headers of the data packets.

18. A method of operating a wireless network in which mobile services are provided by a plurality of virtual operators, wherein the wireless network comprises a plurality of subnetworks, each subnetwork comprising at least one network switch, and at least one air access point comprised of an air interface, an access control module and
an air access point router, wherein the air access point router is coupled to the network switch, at least one router that is connected to the network switch of each of the plurality of subnetworks, and at least one gateway router that is connected to the plurality of subnetworks, the method comprising:
creating a plurality of multiprotocol label switching paths between the air access point in each subnetwork and the at least one gateway router;
assigning each of the multiprotocol label switching paths to one of the plurality of virtual operators so that the virtual operators can be accessed through the air access point of each of the subnetworks; and
assigning each of the plurality of virtual operators an identification tag that is embedded in a packet header of data that is traversing the wireless network.

19. The method of operating a wireless network as claimed in claim 18, the method further comprising assigning multiprotocol label switching information to the headers of data packets traversing the wireless network, and the network switches of the subnetworks route the data packets through the multiprotocol label switching paths based on the headers of the data packets.

20. The method of operating a wireless network as claimed in claim 18, wherein the method further comprises allowing a mobile subscriber access to a predefined list of services based on the type of subscription that the mobile subscriber has with a virtual operator.

21. The method of operating a wireless network as claimed in claim 18, wherein the method further comprises providing access to a predefined list of services in exchange for advertising.

22. The method of operating a wireless network as claimed in claim 18, wherein the method further comprises excluding access to a predefined set of information sources.

23. The method of operating a wireless network as claimed in claim 18, wherein the method further comprises limiting a mobile subscriber's access to the wireless network based upon a virtual operator's QoS limitations.

24. The method of operating a wireless network as claimed in claim 18, wherein the method further comprises collecting accounting information to be sent to the accounting systems of each virtual operator that provides access to the wireless network.

25. The method of operating a wireless network as claimed in claim 24, wherein the accounting information comprises session duration, requested services and level of service provided.

26. The method of operating a wireless network as claimed in claim 18, wherein the method further comprises assessing each mobile subscriber a flat fee for unlimited access to the wireless network.

27. The method of operating a wireless network as claimed in claim 18, wherein the method further comprises assessing each mobile subscriber a fee for each instance that the mobile subscriber accesses the wireless network.

28. The method of operating a wireless network as claimed in claim 18, wherein the method further comprises assessing each mobile subscriber a fee based upon the total amount of time that a mobile subscriber accesses the wireless network.

29. The method of operating a wireless network as claimed in claim 18, wherein transferring a properly authenticated user from a first air access point to a second air access point comprises:
- fetching the profile of the mobile subscriber from the first air access point and storing it at the second air access point;
- signalling the termination of an accounting session that was initiated when the mobile subscriber was granted access at the first air access point;
- establishing a new session at the second air access point; and
- starting a new accounting session at the second air access point.

30. The method of operating a wireless network as claimed in claim 29, wherein the profile of the mobile subscriber at the first air access point comprises a public key associated with the mobile subscriber, access policies associated with the session at the first air access point, the IP address of the mobile terminal and the session key shared by the mobile subscriber and the first air access point.

31. The method of operating a wireless network as claimed in claim 30, wherein establishing a new session at the second air access point comprises:
- generating a session key to be shared by the mobile subscriber and the second air access point:
- encrypting both the session key to be shared by the mobile subscriber and the second air access point and the session key shared by the mobile subscriber and the first air access point with the public key associated with the mobile subscriber and forwarding the encrypted result to the mobile terminal;
- decrypting the encrypted result and determining if the session key to be shared by the mobile subscriber and the second air access point and the session key shared by the mobile subscriber and the first air access point match; and
- if that determination is true, establishing a secure connection between the second air access point and the mobile terminal; otherwise, terminating the access granted to the mobile terminal.

32. The method of operating a wireless network as claimed in claim 31, wherein establishing a new session at the second air access point further comprises informing the at least one gateway router that the mobile subscriber has established a session at the second air access point.

* * * * *